(12) United States Patent
Dorfner (10) Patent No.: US 9,946,397 B2
(45) Date of Patent: Apr. 17, 2018

(54) SENSOR DESIGN FOR ENHANCED TOUCH AND GESTURE DECODING (71) Applicant: Microchip Technology Incorporated, Chandler, AZ (US)

(72) Inventor: Andreas Dorfner, Munich (DE)

(73) Assignee: MICROCHIP TECHNOLOGY INCORPORATED, Chandler, AZ (US)

(*) Notice: Subject to any disclaimer, the term of this patent is extended or adjusted under 35 U.S.C. 154(b) by 25 days.

(21) Appl. No.: 15/182,340

(22) Filed: Jun. 14, 2016

(65) Prior Publication Data

US 2016/0364074 A1  Dec. 15, 2016

Related U.S. Application Data

(60) Provisional application No. 62/175,751, filed on Jun. 15, 2015.

(51) Int. Cl.
  *G06F 3/041* (2006.01)
  *G06F 3/044* (2006.01)

(52) U.S. Cl.
  CPC .......... *G06F 3/0416* (2013.01); *G06F 3/044* (2013.01); *G06F 2203/04101* (2013.01); *G06F 2203/04103* (2013.01)

(58) Field of Classification Search
  CPC ...... G06F 3/041; G06F 3/0412; G06F 3/0416; G06F 3/044; G06F 3/0484; G06F 3/04847–3/04855; G06F 3/0488–3/04886; G06F 2203/04101; G06F 2203/04103
  See application file for complete search history.

(56) References Cited

U.S. PATENT DOCUMENTS

| 2007/0008299 A1 | 1/2007 | Hristov ........................ 345/173 |
| 2009/0128518 A1 | 5/2009 | Kinoshita et al. ............ 345/174 |

(Continued)

FOREIGN PATENT DOCUMENTS

WO  2013/138282 A1  9/2013  ............ G06F 3/041

OTHER PUBLICATIONS

International Search Report and Written Opinion, Application No. PCT/US2016/037484, 12 pages, dated Sep. 5, 2016.

*Primary Examiner* — Nathan Danielsen
(74) *Attorney, Agent, or Firm* — Slayden Grubert Beard PLLC (57) ABSTRACT

A sensor arrangement for capacitive touch and non-touch detection, has a transmission electrode and a predefined number of receiving electrodes coupled with an evaluation unit, wherein the evaluation unit operates in a non-touch detection mode and in a touch detection mode, wherein the transmission electrode generates an alternating electric near field, and wherein in the non-touch detection mode, the evaluation unit evaluates signals from the receiving electrodes to determine a three-dimensional position of an object; and in the touch detection mode a surface touch detection area defined by the predefined number of electrodes is divided into a plurality of segments wherein within each segment at least two electrodes of the predefined number of electrodes contribute with a portion of their electrode surface area such that different electrode surface area ratios are formed for each of the plurality of segments.

31 Claims, 6 Drawing Sheets

(56) References Cited

U.S. PATENT DOCUMENTS

| | | | | |
|---|---|---|---|---|
| 2011/0018557 A1* | 1/2011 | Badaye | ............... | G06F 3/044 324/658 |
| 2011/0096016 A1* | 4/2011 | Yilmaz | ............... | G06F 3/044 345/174 |
| 2013/0293507 A1* | 11/2013 | Singh | ............... | G06F 3/044 345/174 |
| 2014/0306922 A1* | 10/2014 | Yilmaz | ............... | G06F 3/044 345/174 |
| 2014/0327845 A1* | 11/2014 | Yashiro | ............... | G06F 3/044 349/12 |
| 2015/0378498 A1* | 12/2015 | Huie | ............... | G06F 3/044 345/174 |

* cited by examiner

SENSOR DESIGN FOR ENHANCED TOUCH AND GESTURE DECODING

RELATED PATENT APPLICATION

This application claims priority to commonly owned U.S. Provisional Patent Application No. 62/175,751 filed Jun. 15, 2015 which is hereby incorporated by reference herein for all purposes.

TECHNICAL FIELD

The present disclosure relates to capacitive sensing systems and method of operating such, in particular to an electrode arrangement for a capacitive sensing system using electric field effects.

BACKGROUND

A three-dimensional capacitive non-touching detection system generates a quasi-static electric field wherein disturbances in that field that are caused by an object entering the field are evaluated. The evaluation allows for a determination of a three-dimensional location of the object, such as a finger of a user, and to track its position to further determine whether a gesture from a predefined pool of gestures has been performed. Such a system can also operate as a three-dimensional touchless mouse or control any kind of suitable operations without requiring a touch. The system usually uses a transmitting electrode receiving an alternating signal such as a sinusoidal or square wave signal, for example, as mentioned above, having a frequency of 40-200 kHz, to generate the quasi-static alternating electric field. Contrary to, for example, mutual or self capacitance measurements, during measurement the transmitting electrode is supplied permanently with the generator signal and disturbances in the generated field are measured while the field is permanently upheld. The system does not evaluate single pulses, voltages generated by single or multiple pulses and associated charge changes of the sensor electrodes as it is common in capacitance measurement systems, for example, a capacitive voltage divider or a charge time measurement unit used for mutual or self capacitance measurements. In some embodiments, a plurality of receiving electrodes are arranged above a transmitting electrode, for example in a frame-like fashion within a plane to evaluate the quasi-static electric field generated by the transmitting electrode, and from received signals a three-dimensional position of an object can be reconstructed within an integrated circuit device through signal processing. In other embodiments, the same electrodes are used for transmitting and receiving and while still the same electric field is generated, the evaluation measures a load on each transmitter/receiver electrode caused by a disturbance in the electric field.

An example of such a device is the "GestiC©" integrated circuit, also known as MGC3130 manufactured by the assignee of this application. This device is a highly sensitive capacitive sensing technology that can be used for three-dimensional touch-less gesture detection and tracking using a quasi-static alternating electric near field, for example around 40-200 kHz.

SUMMARY

There exists a need to decode multiple touch positions independent of frame based electrode design. For example, there exists a need to extend the number of touch positions to a value>five when using five receiving electrodes.

According to an embodiment, a sensor arrangement for capacitive touch and non-touch detection may comprise a transmission electrode and a predefined number of receiving electrodes coupled with an evaluation unit, wherein the evaluation unit operates in a non-touch detection mode and in a touch detection mode, wherein the transmission electrode generates an alternating electric near field, and wherein in the non-touch detection mode, the evaluation unit evaluates signals from the receiving electrodes to determine a three-dimensional position of an object; and in the touch detection mode a surface touch detection area defined by the predefined number of electrodes is divided into a plurality of segments wherein within each segment at least two electrodes of the predefined number of electrodes contribute with a portion of their electrode surface area such that different electrode surface area ratios are formed for each of the plurality of segments.

According to a further embodiment, each segment may define a virtual touch button and the number of virtual touch buttons is greater than the number of electrodes. According to a further embodiment, each segment may comprise two contributing receiving electrodes. According to a further embodiment, an electrode surface area of each of the two contributing receiving electrodes within a segment may be selected from a first surface area and a second surface area, wherein the first surface area is larger than the second surface area. According to a further embodiment, the predefined number of electrodes can be five and signals from all five receiving electrodes are used in the non-touch detection mode. According to a further embodiment, the predefined number of electrodes can be four and signals from all four receiving electrodes are used in the non-touch detection mode. According to a further embodiment, the sensor arrangement may be operating in the non-touch mode and automatically switches into the touch detection mode upon detection of an object being below a predefined threshold distance to a touch surface. According to a further embodiment, the predefined number of electrodes can be arranged in an interleaved fashion, wherein in the non-touch gesture detection mode four of the electrodes of the predefined number of electrodes provide for a frame-like arrangement. According to a further embodiment, the interleaved sensors may form a frame like structure. According to a further embodiment, a touch of a virtual touch button can be decoded by two contributing electrodes from the plurality of receiving electrodes. According to a further embodiment, the two contributing electrodes can be selected from the plurality of electrodes by signal strength of signals received by a respective receiving electrode. According to a further embodiment, the predefined number of receiving electrodes can be five and the five receiving electrodes are arranged in an interleaved fashion to provide said plurality of segments, wherein the segments are arranged in a matrix covering the surface touch detection area. According to a further embodiment, the matrix may provide for 5×4 segments. According to a further embodiment, the matrix may provide for 3×4 segments and wherein two of the five receiving electrodes provide for an additional slider function. According to a further embodiment, two of the receiving electrodes can be arranged in interdigital fashion, each receiving electrode having a plurality of fingers, and wherein a width of the fingers of each electrode is varied to provide for a slider function. According to a further embodiment, each receiving electrode may have a plurality of fingers and wherein pairs of receiving electrodes are arranged in interdigital fashion along a line to form a row of adjacent segments, each segment defining a virtual button. According to a further embodiment, the line can be a straight line. According to a further embodiment, the line can be curved. According to a further embodiment, a hand movement in non-touch detection mode creates at least two signal shift maxima over time for signal pattern decoding in x- and y dimension.

According to another embodiment, a method for performing a capacitive touch and non-touch detection, the method comprising feeding an alternating signal to a transmission electrode to generate an alternating electric near field and operating an evaluation unit coupled with a predefined number of receiving electrodes in a non-touch detection mode and in a touch detection mode, wherein in the non-touch detection mode, the evaluation unit evaluates signals from the receiving electrodes to determine a three-dimensional position of an object; and in the touch detection mode a surface touch detection area defined by the predefined number of receiving electrodes is divided into a plurality of segments wherein within each segment at least two electrodes of the predefined number of electrodes contribute with a portion of their electrode surface area such that different electrode surface area ratios are formed for each of the plurality of segments and wherein the evaluation unit evaluates signals from a variety of at least two of the predefined number of receiving electrodes to determine a touch location.

According to a further embodiment of the method, each segment may define a virtual touch button and the number of virtual touch buttons is greater than the number of electrodes. According to a further embodiment of the method, each segment may comprise two contributing receiving electrodes. According to a further embodiment of the method, an electrode surface area of each of the two contributing receiving electrodes within a segment may be selected from a first surface area and a second surface area, wherein the first surface area is larger than the second surface area. According to a further embodiment of the method, the predefined number of electrodes can be five and signals from all five receiving electrodes are used in the non-touch detection mode. According to a further embodiment of the method, the predefined number of electrodes can be four and signals from all four receiving electrodes are used in the non-touch detection mode. According to a further embodiment of the method, the sensor arrangement may be operating in the non-touch mode and automatically switches into the touch detection mode upon detection of an object being below a predefined threshold distance to a touch surface. According to a further embodiment of the method, the predefined number of electrodes can be arranged in an interleaved fashion, wherein in the non-touch gesture detection mode four of the electrodes of the predefined number of electrodes provide for a frame-like arrangement. According to a further embodiment of the method, a touch of a virtual touch button can be decoded by two contributing electrodes from the plurality of receiving electrodes. According to a further embodiment of the method, the two contributing electrodes can be selected from the plurality of electrodes by signal strength of signals received by a respective receiving electrode. According to a further embodiment of the method, two of the receiving electrodes can be arranged in interdigital fashion, each receiving electrode having a plurality of fingers, and wherein a width of the fingers of each electrode is varied, the method further comprising evaluating signals from said two of the receiving electrodes to provide for a slider function. According to a further embodiment of the method, a hand movement in non-touch detection mode may create at least two signal shift maxima over time for signal pattern decoding in x- and y dimension.

DETAILED DESCRIPTION

Industrial displays can be equipped with predefined touch input and three-dimensional (3D) gesture detection. Similarly, keypads can be equipped with such additional functionality. For example, a three-dimensional gesture system as described above can be enhanced to also provide for an improved touch detection according to various embodiments.

Some embodiments cover a single layer interleaved electrode structure for multiple button decoding and 3D gesture recognition. The interleaved electrode structure thereby provides a similar structure compared to a conventional 3D gesture detection electrode arrangement. Such embodiments can be operated in a #D gesture detection mode (non-touch detection mode) and in a touch detection mode wherein a threshold may be used as a criteria to switch between the two modes.

According to some embodiments, an unaltered electrode arrangement can be used. In either arrangement, each virtual button will be decoded with their signal ratio of two electrodes. Therefore the 2 electrodes which show the highest signal shift within a set of n buttons are taken for decoding. Besides the button decoding, it is important to have a general electrode placement to maintain meaningful signal patterns for 3D gesture decoding. The general placement is a frame based design as for example shown in FIG. 2. 19. A hand movement in non-touch (3D) detection mode may create at least two signal shift maxima over time for signal pattern decoding in x- and y dimension which can be evaluated and tracked to determine whether a specific predetermined gesture has been performed.

Button decoding is usually performed with touch sensors only. However, according to various embodiments, a 3D gesture system can be enhanced by improved signal processing and a new electrode design to also provide this functionality with a unique decoding technique.

A low cost solution according to some embodiments for industrial displays applications generally support predefined touch positions, sliders and may also provide for detecting a full 3D gesture set. A low cost solution according to some embodiments for keypad/button applications support predefined touch positions, sliders and full 3D gesture set.

Figure 3:
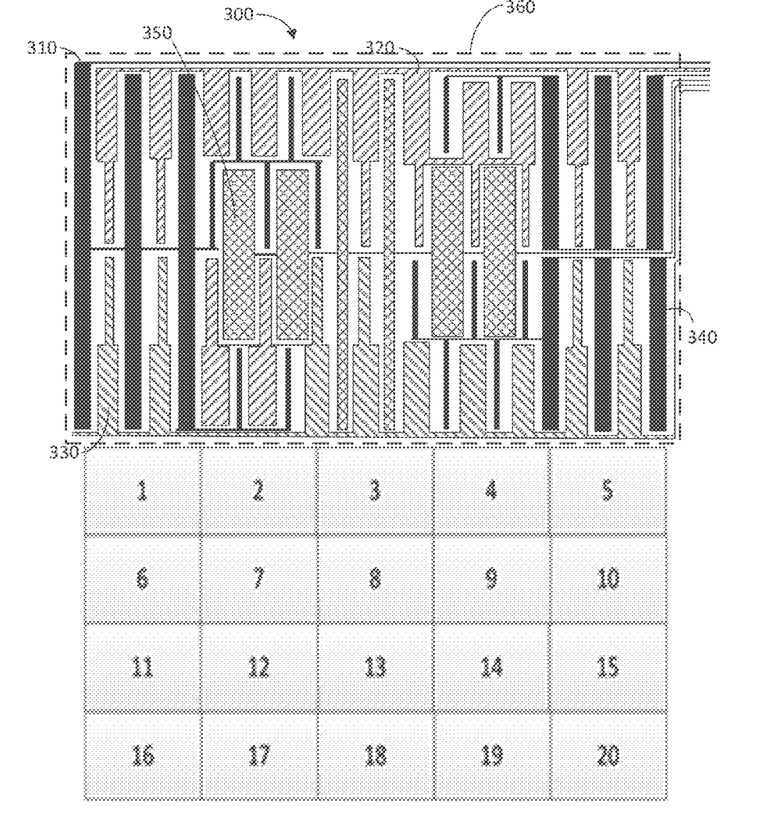
FIG. 3 shows an electrode structure according to a second embodiment.

According to various embodiments, a sensor arrangement with 3D gesture detection and a plurality of touch buttons can be provided. According to an embodiment using 5 receiving electrodes and a single transmission electrode, such a device provides for single touch decoding, e.g., up to 20 positions with 5 Rx channels, and (GestiC©) 3D gesture recognition. The actual interface can be provided using a 2 layer solution Mayer Rx structure, 1 layer solid Tx structure) on a PCB or on a display using ITO-Display integration. The controller can be integrated into a single chip solution similar to existing GestiC© single chips. For 10" display designs, for example, 20 buttons can be realized as shown in FIG. 3, wherein more buttons are possible. Furthermore, a slider decoding can be provided with a dedicated electrode as will be explained in more detail below.

According to various embodiments, a 3D detection controller, such as for example the GestiC© integrated circuit, can be provided with touch support without limitation to touch positions mapped to frame shaped electrodes. The GestiC© system can be enhanced to support more than 5 touches, for example, when 5 Rx electrodes are available, while maintaining required signal pattern for 3D gesture decoding. The same electrodes provided for the 3D gesture detection can be used to provide the specific touch detection wherein no extra components are needed.

Figure 1:
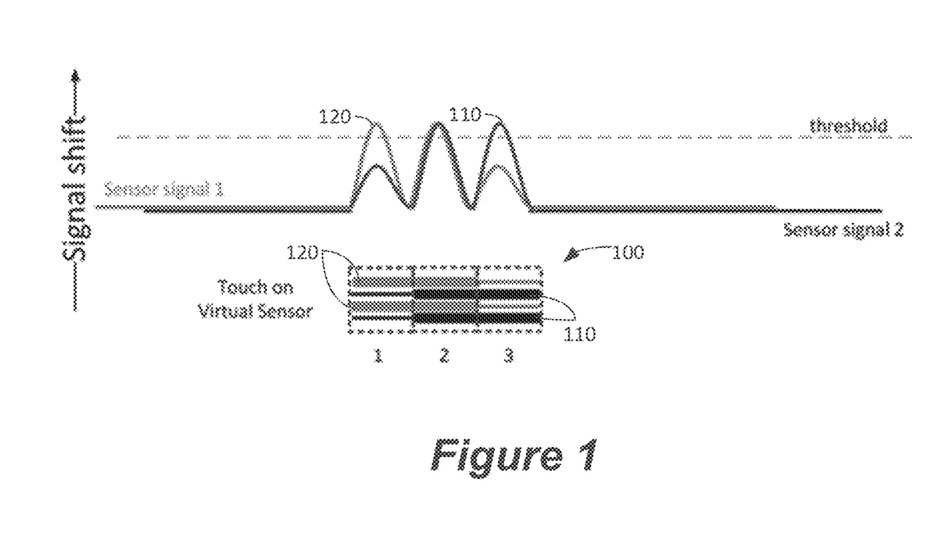
FIG. 1 shows an exemplary electrode shapes and assigned segments as well as associated signal forms.

FIG. 1 shows that using a 3D detection system, touch decoding can be done by the combination of always 2 Rx electrodes. The decoding is done by: Detecting a touch; and Finding the 2 electrodes with the largest signal shift (out of a plurality of electrodes, e.g. 5 electrodes). Then the ratio of the signal of these 2 electrodes is analyzed for virtual touch position decoding. As shown in FIG. 1, a sensor field 100 is formed by two sensor electrodes 110, 120. Each sensor 110, 120 is split into two separate sensor segments that are electrically connected to form a single sensor. The shape of the electrodes is chosen such that the ratio of the sensor area of the two electrodes is different in each different areas of the sensor field. In the example shown in FIG. 1, the sensor field comprises three touch detection areas 1, 2, 3 that each may form a sensor button. The electrodes 110 and 120 are formed such that in the first touch detection area 1, the first electrode 110 contributes a relatively small sensor area while the second electrode 120 contributes a relatively large area. In the second touch detection area 2 both electrodes contribute the same electrode area and the third touch detection area 3, the second electrode 120 contributes a relatively small sensor area while the first electrode 110 contributes a relatively large area. The top of FIG. 1 shows associated signals that can be received from the first and second sensor electrodes 110, 120.

As further shown in FIG. 1, a threshold can be used to determine which area has been touched or whether a touch is about to be performed. In case of a touch in the first area, only the second electrode generates a signal above the threshold. In case of a touch in the second area, both electrodes generate signals above the threshold and In case of a touch in the third area, only the first electrode 110 produces a signal above the threshold. Other ratios may be used to distinguish between different touch locations.

Figure 2:
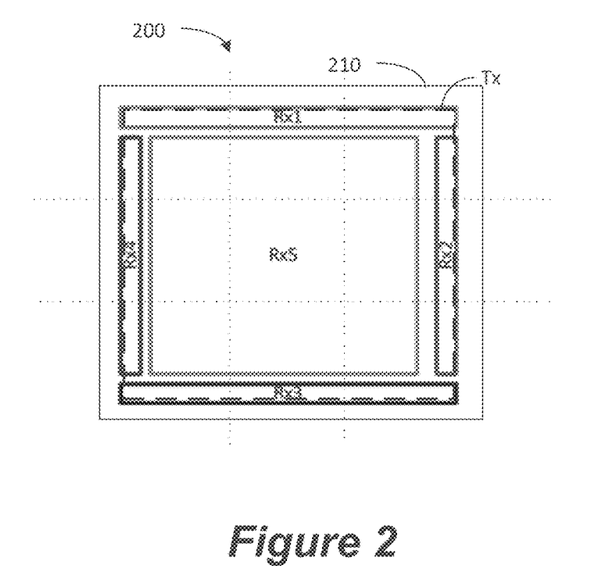
FIG. 2 shows an electrode structure according to a first embodiment.

As shown in FIGS. 2 and 3, the Rx electrodes Rx1, Rx2, Rx3, Rx4, and Rx5 are placed in an arrangement to maintain standard GestiC© gesture pattern decoding. Thus, the electrodes Rx1, Rx2, Rx3, and Rx4 are arranged to frame the center electrode Rx5. FIG. 2 shows a conventional electrode arrangement 200 for a gesture detection system using a quasi-static alternating electric field created by a transmitter electrode. The electrodes Rx1-Rx5 are arranged on a top side of a substrate 210. FIG. 2 also shows the transmitting electrode Tx with a broken line which is arranged on a bottom side of the substrate 210. For example, the electrodes Rx1-Rx5 can be formed by the copper layers of a double sided printed circuit board. A multi-layered printed circuit board may also be used wherein the bottom layer may be used as a ground layer to provide a shield function and the transmitting electrode may formed within an inner layer of the board.

Such an arrangement can be operated in two modes. In the first mode, the sensor arrangement operates as a conventional three-dimensional gesture detection device. Once an approach below a predefined threshold distance is detected, the device can switch into a second operating mode in which the ratios of the signals of the various electrodes are used to determine which one of a plurality of virtual buttons has been touched wherein each virtual button is associated with an area of the sensor surface. For example, the surface of the sensor shown in FIG. 2 could be divided into 9 segments as indicated by the dotted lines.

FIG. 3 shows an electrode design that basically provides a similar structure as the conventional electrode arrangement and furthermore allows the decoding of substantially more touch positions than the number of electrodes. Similar as to FIG. 2, five electrodes 310, 320, 330, 340, and 350 are arranged within a single plane. In the three-dimensional (3D) detection mode, electrode 310 operates equivalent to electrode Rx4, electrode 320 equivalent to Rx1, electrode 340 equivalent to Rx2, electrode 330 equivalent to Rx3 and electrode 350 equivalent to Rx5. Again similar to FIG. 1 a plurality of touch detection areas 1-20 each comprise a different ratio of electrode area of generally two contributing electrodes. The bottom of FIG. 3 shows the 20 touch detection areas. This grid has to be overlaid the electrode structure 300 to visualize the button association. FIG. 3 also shows with broken line a transmission electrode 360 that may be arranged on the bottom side of a substrate on which the electrodes 310-350 are arranged. The area of the transmission electrode is shown in FIG. 3 to be larger than the area covered by the electrodes 310-350. However, the area can also be substantially the same or smaller.

Thus, using the decoding technique according to various embodiments, the sensor arrangement maintains the general frame design and is thereby able to support a plurality of touch position which is substantially greater than the number of electrodes. In the embodiment of FIG. 3 up to 20 or more touch positions can be formed with only 5 electrodes. A limit of up to 20 positions provide for a good manual operation on a 10' display. However, more or less touch position can be realized depending on the size of the display and the number of actual electrodes.

Figure 4:
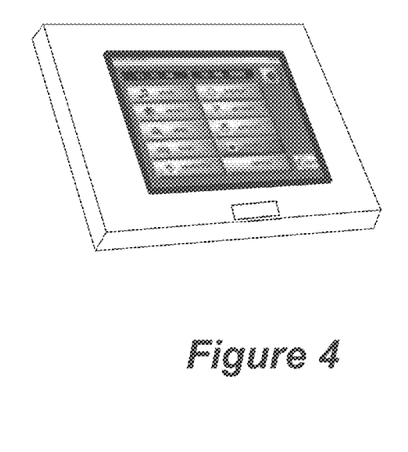
FIG. 4 shows a display using an electrode structure according to various embodiments.

FIG. 4 shows an example of respective displays with such functionality. A small display as the one shown in FIG. 4 may have a limited number of buttons due to its size.

The specific electrode pattern as shown in FIG. 3 still provides for good signal patterns in the 3D gesture decoding mode. Free air gesture decoding requires a unique signal pattern when the hand crosses the sensor arrangement. For each axis there is a requirement to gain at least 2 maxima in the signal shift or a zero crossing in the first derivation of 2 different electrodes. Also the second derivation can be used for signal pattern recognition. The difference of signal shift and/or change in first/second derivation of the electrode signals needs to be measurable over time. This will be maintained by the electrode placement described in the various embodiments and/or by fast processing power of the data acquisition and decoding. The information of more than 2 electrodes in each axis will increase the reliability of the sensor.

The Rx electrode arrangement is not limited to a single layer. The design is not limited to 2 different density levels for decoding. The design is also not limited to 5 Rx electrodes and the design is not limited to use just two of the plurality of electrodes for touch decoding. For example, FIG. 2 shows that the corner touch detection areas use three contributing electrodes.

The design is further not limited to the electrode pattern shown in the examples. The specific interleaved electrode design as shown in FIG. 3 establishes a pattern that provides distinct signal density levels depending on the location. Thus, the various electrodes are shaped such that they contribute different area sizes in the virtual button zones to be able to distinguish between the various virtual button zones. The electrode pattern can vary, depending on the design it may be important, that the pitch of the interleaved design is not larger than a finger pitch, so that a touch by a small and large finger result always in the same or similar ratio between the contributing (touched) electrodes, for example the two of five electrodes in the embodiment of FIG. 3. As can be seen from the pattern in FIG. 3, each buttons area is assigned to two receiving electrodes whose sensor area varies depending on the button location.

Figure 5:
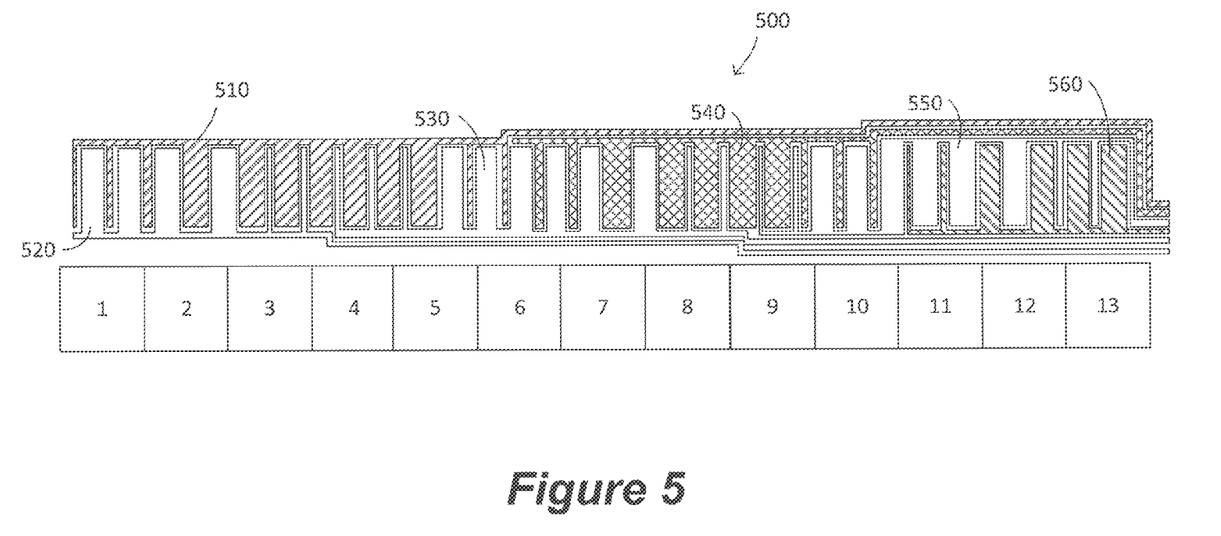
FIGS. 5 and 5a shows an electrode structure according to a third embodiment.
Figure 5A:
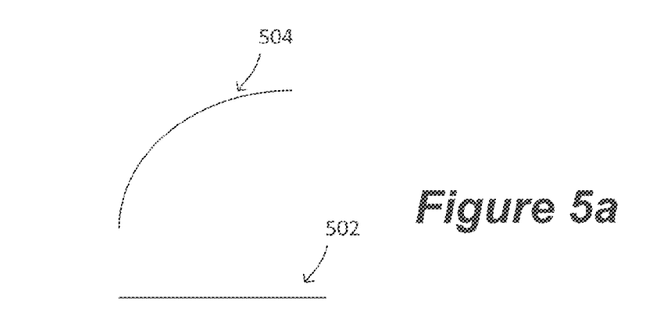

A one-dimensional (1D) electrode design supporting, e.g., 13 touch buttons and 1D gestures (left/right, right/left hand movement, proximity) is shown in FIG. 5. In this example, 6 interleaved electrodes 510, 520, 530, 540, 550, and 560 are provided. Each electrode has an interdigital shape wherein the width of the fingers is varied along a single dimension, here the x-axis. However, this arrangement can be also be made along the y-axis or transformed into a circular shape. For example, FIG. 5a indicates with line 502 a linear arrangement as shown in FIG. 5. However, the same arrangement can be transformed to follow a circular section 504 as shown in FIG. 5a. The one-dimensional electrode design can be transformed to any other possible one-dimensional lines.

Each of the electrodes 510-560 comprises a plurality of fingers. FIG. 5 shows the associated virtual button areas 1-13 and needs to be overlaid the electrode structure 500 to visualize the button association. The width of the fingers basically varies between large and small in this embodiment allowing for three combinations per electrode pair. However, other ratios may apply and more than two electrodes may be used to determine a virtual button. FIG. 5 does not show the transmission electrode. However, the same principles for the transmission electrode as shown in FIG. 3 apply.

Figure 6:
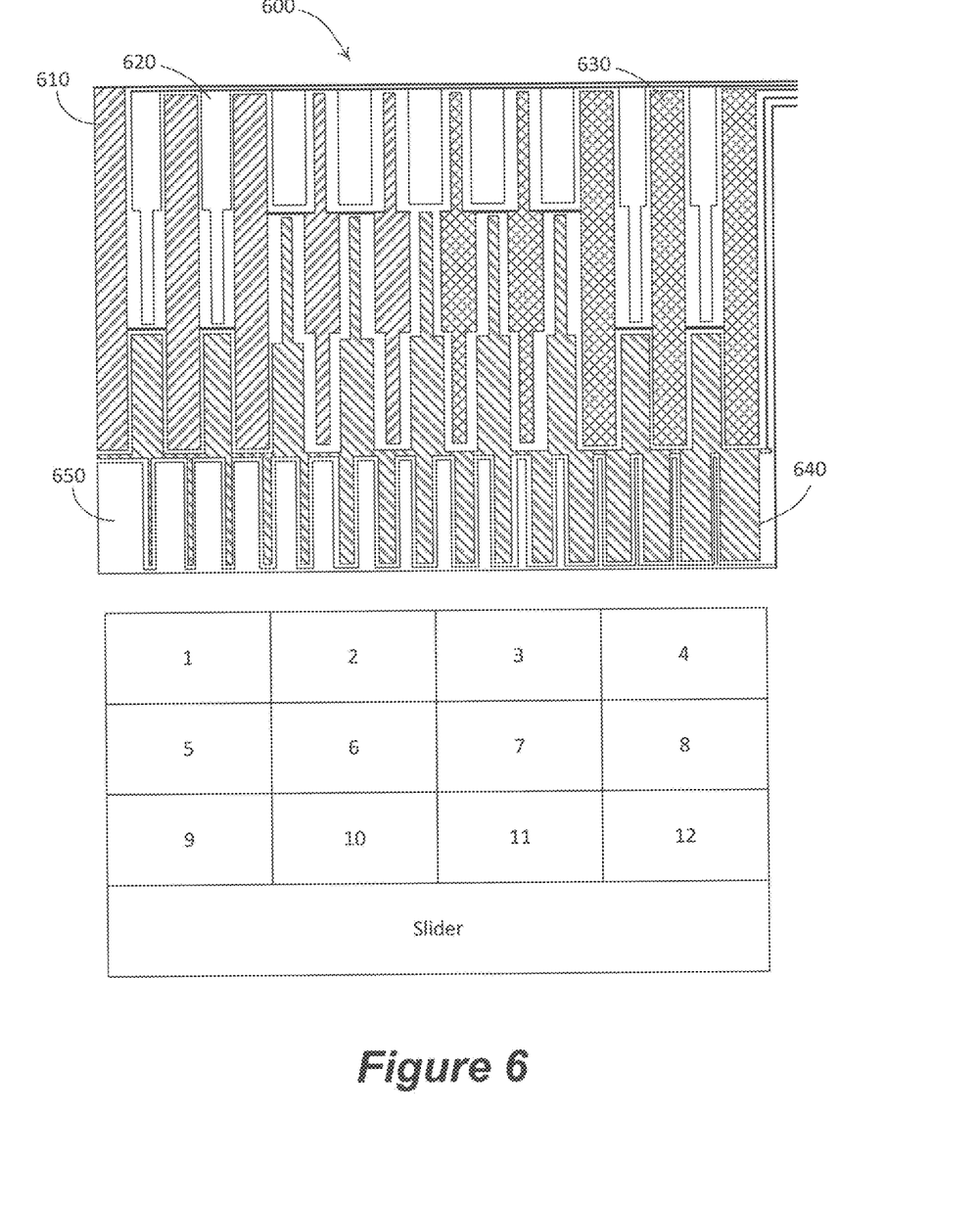
FIG. 6 shows an electrode structure according to a fourth embodiment.

FIG. 6 shows yet another possible embodiment an electrode layout 600 that establishes 12 touch buttons and a slider function at the bottom. This arrangement uses 5 electrodes 610, 620, 630, 640, and 650. In the 3D gesture detection mode, electrode 610 operates as the RX4 of the conventional arrangement shown in FIG. 2, electrode 620 operates similar to Rx1, electrode 630 similar to Rx2, and electrode 640 similar to Rx3. In the touch detection mode, four of the five electrodes are used to form 12 virtual buttons 1-12 wherein always two of the four electrodes 610, 620, 630, and 640 are used to define respective virtual button areas. In other words, always two of the four electrodes 610, 620, 630, and 640 contribute to a virtual button field 1-12, wherein different ratios of electrode areas are established through respective shapes of the electrodes.

Again, FIG. 6 shows at the bottom the respective virtual buttons and a slider wherein this grid is to be overlaid the electrode structure 600 to show the association. For the first three rows that comprise the virtual buttons it can be seen, that electrode 620 contributes approximately the same electrode area to each virtual button field 1-4 whereas electrodes 610 and 630 contribute to field 1, 2 and 3, 4 with different electrode areas, respectively. In the second row, electrodes 610 and 630 contribute approximately the same electrode area to virtual fields 5, 6 and 7, 8, respectively, electrode 620 contributes to virtual field 5 and 8 whereas electrode 640 contributes to virtual fields 6 and 7. In the third row, the electrodes are shaped such that electrode 640 contributes approximately the same electrode area to each virtual field 9-12 whereas electrodes 610 and 630 contribute different electrode area sizes to virtual fields 9, 10 and 11, 12, respectively.

In addition, a fifth electrode 650 together with electrode 640 provide for a slider function at the bottom of the electrode arrangement. To this end, the horizontal slider provides a varying electrode area ratio between the two electrodes 640 and 650 along a horizontal x axis at the bottom of the electrode structure 600. The two electrodes 640 and 650 are arranged in interdigital fashion wherein the width of the fingers of the electrodes vary from small to large for one electrode and from large to small for the respective other electrode.

In summary, this embodiment provides four electrodes 610-640 for 3D detection that are arranged in a frame like manner. An additional electrode 650 is interleaved with the N-electrode to provide for an additional slider functionality. FIG. 6 does not show the transmission electrode. However, the same principles for the transmission electrode as shown in FIG. 3 apply.

Figure 7:
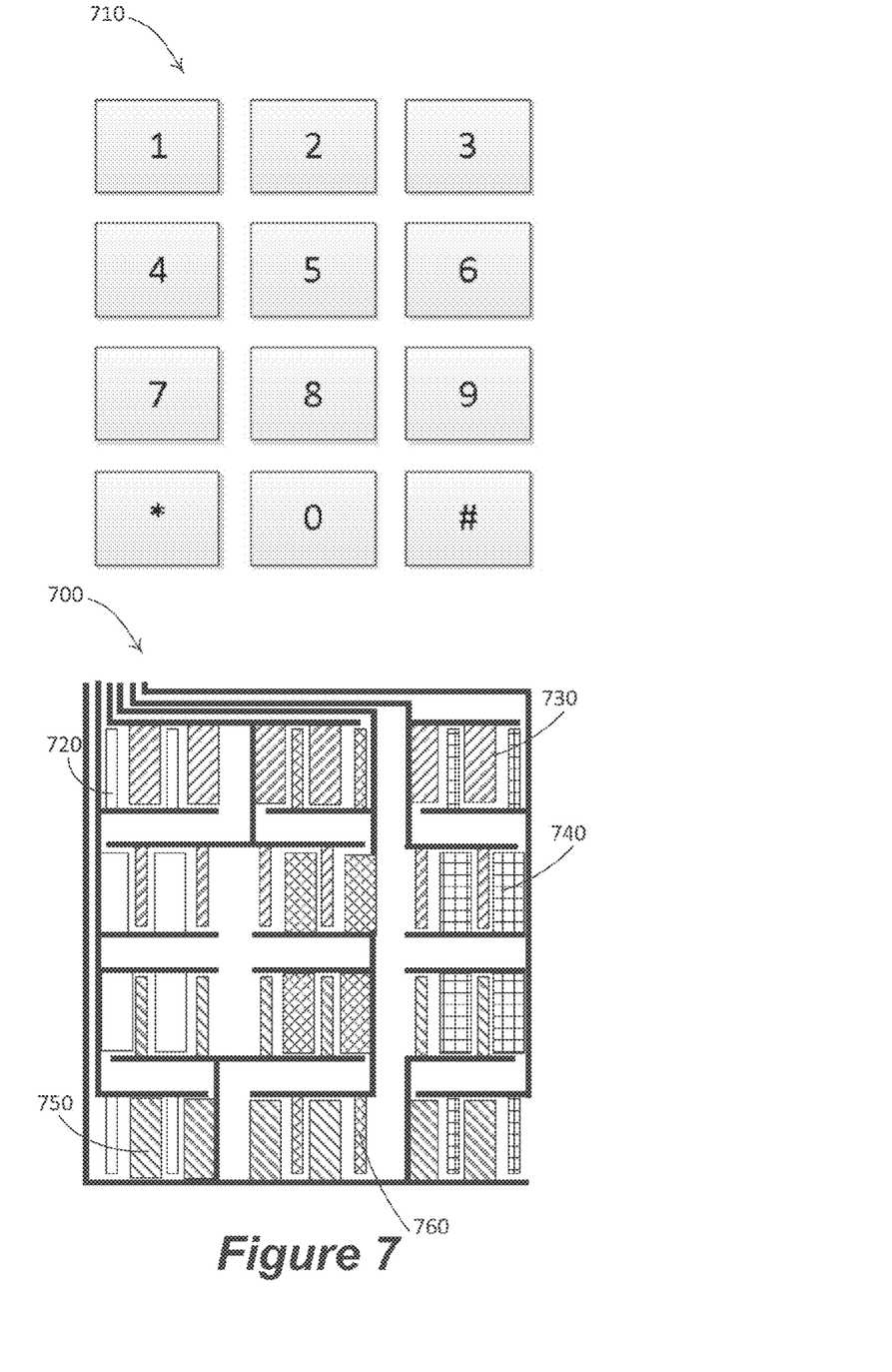
FIG. 7 shows an electrode structure according to a fifth embodiment.

FIG. 7 shows yet another possible embodiment an electrode layout 700 that establishes 12 touch buttons arranged similar to a typical phone keyboard. This arrangement uses 6 electrodes 720, 730, 740, 640, 750, and 760. In the 3D gesture detection mode, electrode 760 operates as the RX5 electrode of the conventional arrangement shown in FIG. 2, electrode 730 operates similar to Rx1, electrode 740 similar to Rx2, electrode 750 similar to Rx3, and electrode 720 operates similar to Rx4. In the touch detection mode, these five electrodes are used to form 12 virtual buttons 0-9, *, # wherein always two of the four electrodes 720, 730, 740, 750, and 760 are used to define respective virtual button areas. In other words, always two of the four electrodes 720, 730, 740, 750, and 760 contribute to a virtual button field 0-9, *, #, wherein different ratios of electrode areas are established through respective shapes of the electrodes.

FIG. 7 shows the electrode arrangement 700 at the bottom and the respective virtual buttons 710 in the top of FIG. 7 wherein this grid 710 is again to be overlaid over the electrode structure 700 to show the association. The contribution of the electrode areas to each virtual button is similar to the other embodiments and can be seen in FIG. 7.

Figure 8:
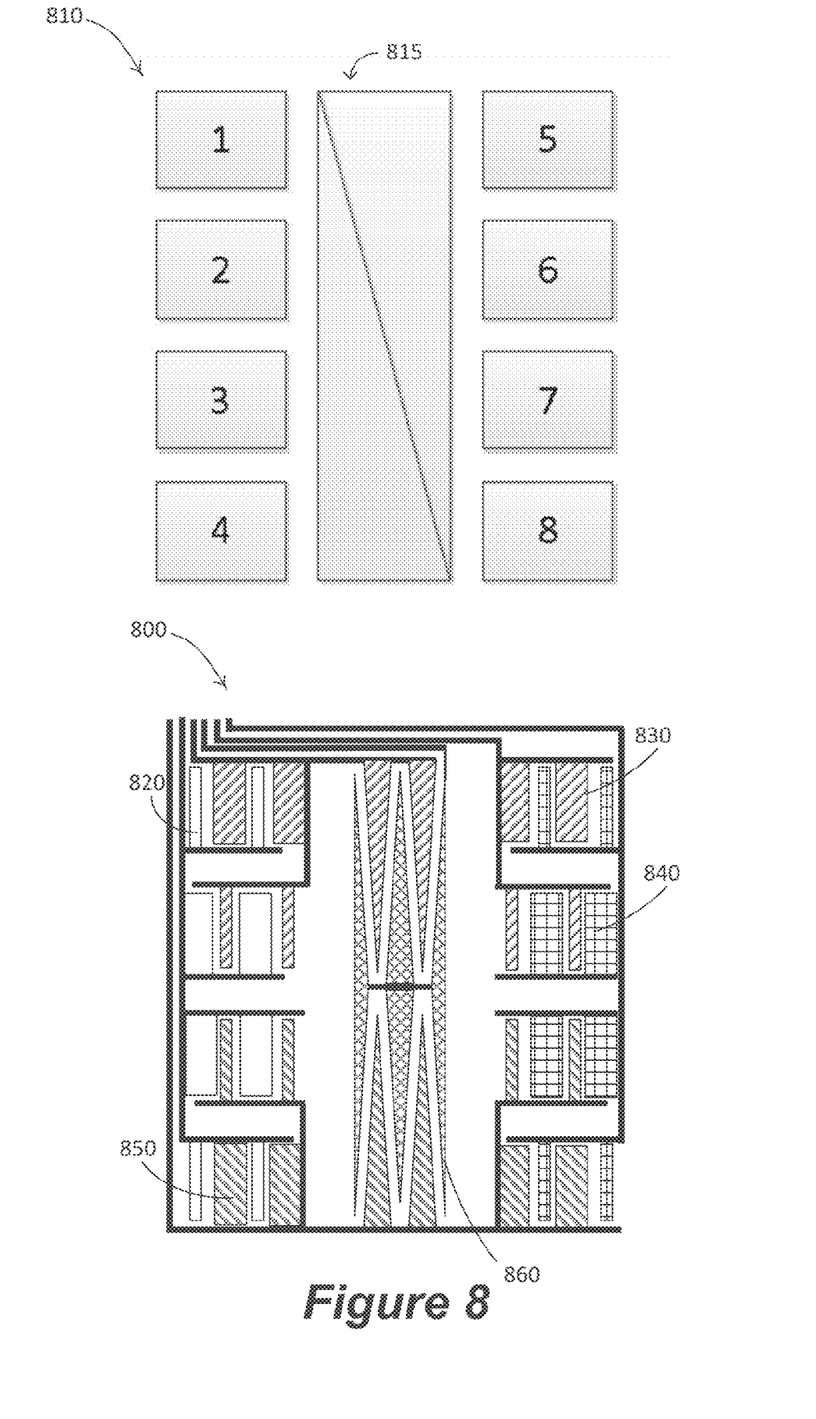
FIG. 8 shows an electrode structure according to a sixth embodiment.

FIG. 8 shows yet another possible embodiment an electrode layout 800 that establishes 8 touch buttons arranged in two groups of four buttons and a vertical slider 815 arranged between the two groups. This arrangement uses again only 5 electrodes 820, 730, 740, 640, and 750. In the 3D gesture detection mode, electrode 860 operates as the RX5 electrode of the conventional arrangement shown in FIG. 2, electrode 830 operates similar to Rx1, electrode 840 similar to Rx2, electrode 850 similar to Rx3, and electrode 820 operates similar to Rx4. In the touch detection mode, four of the five electrodes are used to form 8 virtual buttons 1-8 arranged in two groups, wherein always two of the four electrodes 820, 830, 840, and 850 are used to define respective virtual button areas. In other words, always two of the four electrodes 820, 830, 840, and 850 contribute to a virtual button field 1-8, wherein different ratios of electrode areas are established through respective shapes of the electrodes.

In addition, a fifth electrode 860 together with electrodes 830 and 850 provide for a vertical slider function in the center of the electrode arrangement. To this end, the vertical slider provides a varying electrode area ratio between the two or three electrodes 830, 850, and 860 along a vertical y axis in the center of the electrode structure 800. Contributing segments of electrode 830 and 850 have the form of a triangle wherein center electrode 860 fills the gap that results form the triangle arrangement of the contributing segments of electrodes 830 and 850 as shown in FIG. 8. Depending on vertical finger position generally two of the electrode segments contribute. However, in the center position all three electrodes 830, 850 and 860 may contribute.

FIG. 8 shows the electrode arrangement 800 at the bottom and the respective virtual buttons 810 and slider 815 in the top of FIG. 8 wherein this grid 810 is again to be overlaid over the electrode structure 800 to show the association. The contribution of the electrode areas to each virtual button is similar to the other embodiments and can be seen in FIG. 8.

All electrodes are shown using different hatchings in the various figures to better distinguish between the various electrodes. However, the electrodes are generally considered to be all solid fully filled flat electrodes formed, for example, by a layer of a printed circuit board. Thus, the outer lines as shown in the various figures determine the shape of the electrodes and the fill pattern is merely used to distinguish between the electrodes. However, instead of being fully filled some or all of the electrodes may be formed by respective grid or mash pattern, for example using one or more of the shown patterns in the various figures.

The invention claimed is:

1. A sensor arrangement for capacitive touch and non-touch detection, comprising a transmission electrode and a predefined number of receiving electrodes coupled with an evaluation unit, wherein the evaluation unit operates in a non-touch detection mode and in a touch detection mode, wherein the transmission electrode generates an alternating electric near field, and
   in the non-touch detection mode, the evaluation unit evaluates signals from the receiving electrodes to determine a three-dimensional position of an object; and
   in the touch detection mode a surface touch detection area defined by the predefined number of electrodes is divided into a plurality of segments wherein within each segment at least two electrodes of the predefined number of electrodes contribute with a portion of their electrode surface area such that different electrode surface area ratios are formed for each of the plurality of segments.

2. The sensor arrangement according to claim 1, wherein each segment defines a virtual touch button and the number of virtual touch buttons is greater than the number of electrodes.

3. The sensor arrangement according to claim 2, wherein a touch of a virtual touch button is decoded by two contributing electrodes from the plurality of receiving electrodes.

4. The sensor arrangement according to claim 3, wherein the two contributing electrodes are selected from the plurality of electrodes by signal strength of signals received by a respective receiving electrode.

5. The sensor arrangement according to claim 1, wherein each segment comprises two contributing receiving electrodes.

6. The sensor arrangement according to claim 5, wherein an electrode surface area of each of the two contributing receiving electrodes within a segment is selected from a first surface area and a second surface area, wherein the first surface area is larger than the second surface area.

7. The sensor arrangement according to claim 1, wherein the predefined number of electrodes is five and signals from all five receiving electrodes are used in the non-touch detection mode.

8. The sensor arrangement according to claim 1, wherein the predefined number of electrodes is four and signals from all four receiving electrodes are used in the non-touch detection mode.

9. The sensor arrangement according to claim 1, wherein the sensor arrangement is operating in the non-touch mode and automatically switches into the touch detection mode upon detection of an object being below a predefined threshold distance to a touch surface.

10. The sensor arrangement according to claim 1, wherein the predefined number of electrodes are arranged in an interleaved fashion, wherein in the non-touch gesture detection mode four of the electrodes of the predefined number of electrodes provide for a frame-like arrangement.

11. The sensor arrangement according to claim 10, wherein the interleaved sensors form a frame like structure.

12. The sensor arrangement according to claim 1, wherein the predefined number of receiving electrodes is five and the five receiving electrodes are arranged in an interleaved fashion to provide said plurality of segments, wherein the segments are arranged in a matrix covering the surface touch detection area.

13. The sensor arrangement according to claim 12, wherein the matrix provides for 5×4 segments.

14. The sensor arrangement according to claim 12, wherein the matrix provides for 3×4 segments and wherein two of the five receiving electrodes provide for an additional slider function.

15. The sensor arrangement according to claim 1, wherein two of the receiving electrodes are arranged in interdigital fashion, each receiving electrode having a plurality of fingers, and wherein a width of the fingers of each electrode is varied to provide for a slider function.

16. The sensor arrangement according to claim 1, wherein each receiving electrode has a plurality of fingers and wherein pairs of receiving electrodes are arranged in interdigital fashion along a line to form a row of adjacent segments, each segment defining a virtual button.

17. The sensor arrangement according to claim 1, wherein the line is a straight line.

18. The sensor arrangement according to claim 1, wherein the line is curved.

19. The sensor arrangement according to claim 1, wherein a hand movement in non-touch detection mode creates at least two signal shift maxima over time for signal pattern decoding in x- and y dimension.

20. A method for performing a capacitive touch and non-touch detection, the method comprising feeding an alternating signal to a transmission electrode to generate an alternating electric near field and operating an evaluation unit coupled with a predefined number of receiving electrodes in a non-touch detection mode and in a touch detection mode, wherein
   in the non-touch detection mode, evaluating, by the evaluation unit, signals from the receiving electrodes to determine a three-dimensional position of an object; and
   in the touch detection mode, evaluating, by the evaluation unit, signals from at least two of a predefined number of receiving electrodes to determine a touch location, wherein, in the touch detection mode, a surface touch detection area defined by the predefined number of receiving electrodes is divided into a plurality of segments, and within each segment, the at least two electrodes of the predefined number of electrodes contribute with a portion of their electrode surface area such that different electrode surface area ratios are formed for each of the plurality of segments.

21. The method according to claim 20, wherein each segment defines a virtual touch button and the number of virtual touch buttons is greater than the number of electrodes.

22. The method according to claim 21, wherein a touch of a virtual touch button is decoded by two contributing electrodes from the plurality of receiving electrodes.

23. The method according to claim 22, wherein the two contributing electrodes are selected from the plurality of electrodes by signal strength of signals received by a respective receiving electrode.

24. The method according to claim 20, wherein each segment comprises two contributing receiving electrodes.

25. The method according to claim 24, wherein an electrode surface area of each of the two contributing receiving electrodes within a segment is selected from a first surface area and a second surface area, wherein the first surface area is larger than the second surface area.

26. The method according to claim 20, wherein the predefined number of electrodes is five and signals from all five receiving electrodes are used in the non-touch detection mode.

27. The method according to claim 20, wherein the predefined number of electrodes is four and signals from all four receiving electrodes are used in the non-touch detection mode.

28. The method according to claim 20, wherein the sensor arrangement is operating in the non-touch mode and automatically switches into the touch detection mode upon detection of an object being below a predefined threshold distance to a touch surface.

29. The method according to claim 20, wherein the predefined number of electrodes are arranged in an interleaved fashion, wherein in the non-touch gesture detection mode four of the electrodes of the predefined number of electrodes provide for a frame-like arrangement.

30. The method according to claim 20, wherein two of the receiving electrodes are arranged in interdigital fashion, each receiving electrode having a plurality of fingers, and wherein a width of the fingers of each electrode is varied, the method further comprising evaluating signals from said two of the receiving electrodes to provide for a slider function.

31. The method according to claim 20, wherein a hand movement in non-touch detection mode creates at least two signal shift maxima over time for signal pattern decoding in x- and y dimension.

* * * * *